United States Patent
Fontanel et al.

(10) Patent No.: US 10,529,074 B2
(45) Date of Patent: Jan. 7, 2020

(54) CAMERA POSE AND PLANE ESTIMATION USING ACTIVE MARKERS AND A DYNAMIC VISION SENSOR

(71) Applicant: Samsung Electronics Co., Ltd., Gyeonggi-Do (KR)

(72) Inventors: Fannie Fontanel, Sunnyvale, CA (US); Ankur Gupta, Santa Clara, CA (US); Michael Sapienza, Mountain View, CA (US); Abhijit Z. Bendale, Sunnyvale, CA (US); Pranav Mistry, Campbell, CA (US)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 128 days.

(21) Appl. No.: 15/962,841

(22) Filed: Apr. 25, 2018

(65) Prior Publication Data

US 2019/0096068 A1 Mar. 28, 2019

Related U.S. Application Data (60) Provisional application No. 62/564,967, filed on Sep. 28, 2017.

(51) Int. Cl.
*G06T 7/73* (2017.01)
*G06T 7/20* (2017.01)

(52) U.S. Cl.
CPC ............... *G06T 7/20* (2013.01); *G06T 7/73* (2017.01); *G06T 2207/30204* (2013.01); *G06T 2207/30244* (2013.01)

(58) Field of Classification Search
CPC ... G06T 7/20; G06T 7/73; G06T 2207/30244; G06T 2207/30204
See application file for complete search history.

(56) References Cited

U.S. PATENT DOCUMENTS

| 8,542,250 B2 | 9/2013 | Beasley et al. |
| 9,131,220 B2 | 9/2015 | Givon |

(Continued)

FOREIGN PATENT DOCUMENTS

| JP | 2002-071313 A | 3/2002 |

OTHER PUBLICATIONS

Müller et al. "A Miniature Low-Power Sensor System for Real Time 2D Visual Tracking of LED Markers." IEEE International Conference on Robotics and Biomimetics, Dec. 7, 2011, pp. 2429-2434 (Year: 2011).*

(Continued)

*Primary Examiner* — Jon Chang
(74) *Attorney, Agent, or Firm* — Cuenot, Forsythe & Kim, LLC (57) ABSTRACT

A method of camera pose and plane estimation may include detecting a marker within a 3-dimensional (3D) environment by detecting, using a Dynamic Vision Sensor (DVS), a first plurality of light sources arranged in a known shape and blinking at a first frequency, wherein the known shape corresponds to the marker, determining an orientation and an identity of the marker based upon detecting, using the DVS, a second plurality of light sources corresponding to the marker and blinking at a second frequency different from the first frequency. A camera pose for the DVS may be determined based upon the known shape, the orientation, and the identity of the marker using the processor.

28 Claims, 4 Drawing Sheets

(56) References Cited

U.S. PATENT DOCUMENTS

| | | | |
|---|---|---|---|
| 9,370,302 B2 | 6/2016 | Krueger | |
| 9,761,054 B2 | 9/2017 | Bronder et al. | |
| 2004/0145470 A1* | 7/2004 | Fager | G01S 5/0018 340/539.13 |
| 2006/0293810 A1 | 12/2006 | Nakamoto | |
| 2009/0295791 A1 | 12/2009 | Aquera Y Arcas et al. | |
| 2012/0244939 A1* | 9/2012 | Braun | G06K 9/228 463/31 |
| 2014/0160117 A1* | 6/2014 | Nehmadi | G06F 3/0304 345/419 |
| 2014/0225916 A1* | 8/2014 | Theimer | G06T 19/006 345/633 |
| 2014/0340424 A1* | 11/2014 | Ellsworth | G02B 27/0172 345/633 |
| 2014/0369557 A1 | 12/2014 | Kayombya et al. | |
| 2015/0094142 A1 | 4/2015 | Stafford | |
| 2015/0235423 A1* | 8/2015 | Tobita | G06T 19/006 345/633 |
| 2015/0279083 A1 | 10/2015 | Pradeep et al. | |
| 2016/0105661 A1 | 4/2016 | Givon | |
| 2016/0140729 A1 | 5/2016 | Saotto et al. | |
| 2016/0154088 A1* | 6/2016 | Holtman | G01S 5/16 |
| 2016/0267662 A1 | 9/2016 | Sugden | |
| 2016/0320951 A1 | 11/2016 | Ernst et al. | |
| 2017/0032536 A1 | 2/2017 | Lee et al. | |
| 2017/0102772 A1 | 4/2017 | Hesch et al. | |
| 2017/0124693 A1 | 5/2017 | Ramalingam et al. | |
| 2017/0132794 A1 | 5/2017 | Lee et al. | |
| 2017/0178272 A1* | 6/2017 | Lashkari | G02B 27/017 |
| 2017/0213105 A1 | 7/2017 | Ji et al. | |
| 2019/0096081 A1 | 3/2019 | Gupta et al. | |

OTHER PUBLICATIONS

Gallego, G. et al., "Event-based Camera P ose Tracking U sing a Generative Event Model," arXiv preprint arXiv:1510.01972, Oct. 7, 2015, 7 pg.

Faessler, M. et al., "A Monocular Pose Estimation System Based on Infrared LEDs," In 2014 IEEE Int'l. Conf. on Robotics and Automation (ICRA), May 31, 2014, pp. 907-913.

WIPO Appln. PCT/KR2018/011400, Written Opinion, dated Jan. 2, 2019, 5 pG.

WIPO Appln. PCT/KR2018/011400, Int'l. Search Report, dated Jan. 2, 2019, 4 pg.

Garrido-Jurado, S. et al., "Automatic generation and detection of highly reliable fiducial markers under occlusion," Pattern Recognition, Jun. 1, 2014, vol. 47, No. 6, pp. 2280-2292.

Hofstetter, M., "Temporal Pattern-Based Active Marker Identification and Tracking Using a Dynamic Vision Sensor," Doctoral dissertation, Master thesis, Institue of Neuroinformatics, ETH Zurich.

"OpenCV: Detection of ArUco Markers," [online] OpenCV.Org, Aug. 4, 2017 [retrieved Jan. 12, 2018], retrieved from the Internet: <https://docs.opencv.org/3.1.0/d5/dae/tutorial_aruco_detection.html>, 12 pg.

Censi, A. et al., "Low-latency localization by Active LED Markers tracking using a Dynamic Vision Sensor," In IEEE/RSJ Int'l. Conf. on Intelligent Robots and Systems (IROS), Nov. 3, 2013, pp. 891-898).

Kim, E., "Event-based Camera Calibration," [online] YouTube, Apr. 14, 2016 [retrieved Apr. 25, 2018], retrieved from the Internet: https://www.youtube.com/watch?v=OK_m6Oobnt>.

Lepetit, V. et al., "EPnP: An Accurate O(n) Solution to the PnP Problem," Int'l. Journal of Computer Vision, 2009, vol. 81, No. 2, pp. 155-166.

Delbruck, T., et al., "Integration of dynamic vision sensor with inertial measurement unit for electronically stabilized event-based vision," In 2014 IEEE Int'l. Sym. on Circuits and Systems (ISCAS), 2014, pp. 2636-2639, Abstract only, retrieved from the Internet: <https://ieeexplore.ieee.org/document/6865714/>, 2 pg.

WIPO Appln. PCT/KR2018/011545, Written Opinion, dated Jan. 4, 2019, 4 pg.

WIPO App PCT/KR2018/011545, Int'l. Search Report, dated Jan. 4, 2019, 3 pg.

\* cited by examiner

CAMERA POSE AND PLANE ESTIMATION USING ACTIVE MARKERS AND A DYNAMIC VISION SENSOR

CROSS-REFERENCE TO RELATED APPLICATIONS

This application claims the benefit of U.S. Provisional Patent Application No. 62/564,967 filed on Sep. 28, 2017, which is fully incorporated herein by reference.

TECHNICAL FIELD

This disclosure relates to camera pose and plane estimation within a 3-dimensional environment using one or more active markers and a Dynamic Vision Sensor.

BACKGROUND

A variety of different technologies rely upon accurate determination of position and orientation of a camera, referred to as the "pose" of the camera or "camera pose." For example, robotics and computer vision systems, such as augmented reality and/or virtual reality systems, rely upon camera pose extensively. The ability to accurately determine and track camera pose allows a system to determine the position and orientation of 3-dimensional (3D) virtual objects with respect to the camera.

Conventional systems for estimating and tracking camera pose often rely upon photographic cameras. Photographic cameras are also referred to as "RGB" (Red, Green, Blue) cameras. Some systems utilize an RGB camera and one or more distinctive markers placed at, or affixed to, particular locations within the 3D environment to determine camera pose. Other systems such as Simultaneous Localization and Mapping (SLAM) based systems utilize RGB cameras and further create a map that is used for purposes of determining and/or tracking camera pose.

RGB cameras have a variety of characteristics that make them unsuitable for many applications that depend upon camera pose. For example, RGB cameras tend to be costly. RGB cameras also consume a significant amount of power. Many low power devices such as mobile phones, drones, and certain wearable devices like smart glasses operate primarily on battery power making power consumption an important consideration. RGB cameras are largely unsuitable for use in low power devices.

Other aspects of RGB cameras further limit the usefulness of the devices for camera pose estimation and tracking. For example, RGB cameras have relatively low frame rates that make the cameras sensitive to motion blur. Motion blur may lead to camera pose tracking failure. Frame-by-frame marker detection in RGB images is computationally expensive. The relatively low dynamic range of RGB cameras makes recognizing objects in very bright or in very dark 3D environments difficult.

SUMMARY

In one or more embodiments, a method includes detecting a marker within a 3-dimensional (3D) environment by detecting, using a Dynamic Vision Sensor (DVS), a first plurality of light sources arranged in a known shape and blinking at a first frequency, wherein the known shape corresponds to the marker, determining an orientation and an identity of the marker based upon detecting, using the DVS, a second plurality of light sources corresponding to the marker and blinking at a second frequency different from the first frequency, and determining, using a processor, a camera pose for the DVS based upon the known shape, the orientation, and the identity of the marker.

In one or more embodiments, a system includes a DVS configured to generate an event stream, a memory configured to store the event stream, and a processor coupled to the memory and configured to perform operations using the event stream. The operations may include detecting a marker within a 3D environment by detecting a first plurality of light sources of the marker configured to blink at a first frequency, wherein the marker has a known shape, determining an orientation and an identity of the marker based upon detecting a second plurality of light sources of the marker configured to blink at a second frequency different from the first frequency, and determining a camera pose for the DVS based upon the known shape, the orientation, and the identity of the marker.

In one or more embodiments, a computer program product includes a computer readable storage medium having program code stored thereon. The program code is executable by a processor to perform operations. The operations may include detecting, using a DVS, a marker within a 3D environment by detecting a first plurality of light sources arranged in a known shape and blinking at a first frequency, wherein the known shape corresponds to the marker, determining an orientation and an identity of the marker based upon detecting, using the DVS, a second plurality of light sources corresponding to the marker and blinking at a second frequency different from the first frequency, and determining a camera pose for the DVS based upon the known shape, the orientation, and the identity of the marker.

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

The accompanying drawings show one or more embodiments; however, the accompanying drawings should not be taken to limit the invention to only the embodiments shown. Various aspects and advantages will become apparent upon review of the following detailed description and upon reference to the drawings.

DETAILED DESCRIPTION

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to camera pose and plane estimation within a 3-dimensional (3D) environment using one or more active markers and a Dynamic Vision Sensor (DVS). In accordance with the inventive arrangements described within this disclosure, a system is provided that is capable of estimating camera pose and detecting planes within a 3D environment. The camera pose may be a 6 degrees of freedom (6DoF) camera pose. The system utilizes a DVS to generate an event stream corresponding to a field of view obtained within the 3D environment. The system is capable of processing the event stream generated by the DVS to detect one or more markers contained therein.

The marker(s) are active devices. For example, the markers may include a plurality of light sources that may be controlled to generate customizable patterns. The light sources may be configured to blink with varying frequencies. In one or more embodiments, a first plurality of light sources of the marker(s) are configured to blink at a first frequency. A second plurality of light sources of the marker (s) are configured to blink at a second frequency. The second frequency may be different from the first frequency. In general, the system is capable of detecting marker(s) using the first plurality of light sources and determining an orientation and an identification for each marker using the second plurality of light sources of the respective marker(s).

The system is capable of estimating camera pose for the DVS based upon the known shape of each marker (e.g., the shape of the light sources of each marker), the orientation of detected marker(s), and the identification of the detected markers. The system may also detect a plane within the 3D environment. The detected planes correspond to the locations of the detected marker(s) within the 3D environment. In particular embodiments, the system is capable of performing image stabilization on the event stream generated by the DVS for improved accuracy.

Further aspects of the inventive arrangements are described below in greater detail with reference to the figures. For purposes of simplicity and clarity of illustration, elements shown in the figures are not necessarily drawn to scale. For example, the dimensions of some of the elements may be exaggerated relative to other elements for clarity. Further, where considered appropriate, reference numbers are repeated among the figures to indicate corresponding, analogous, or like features.

Figure 1:
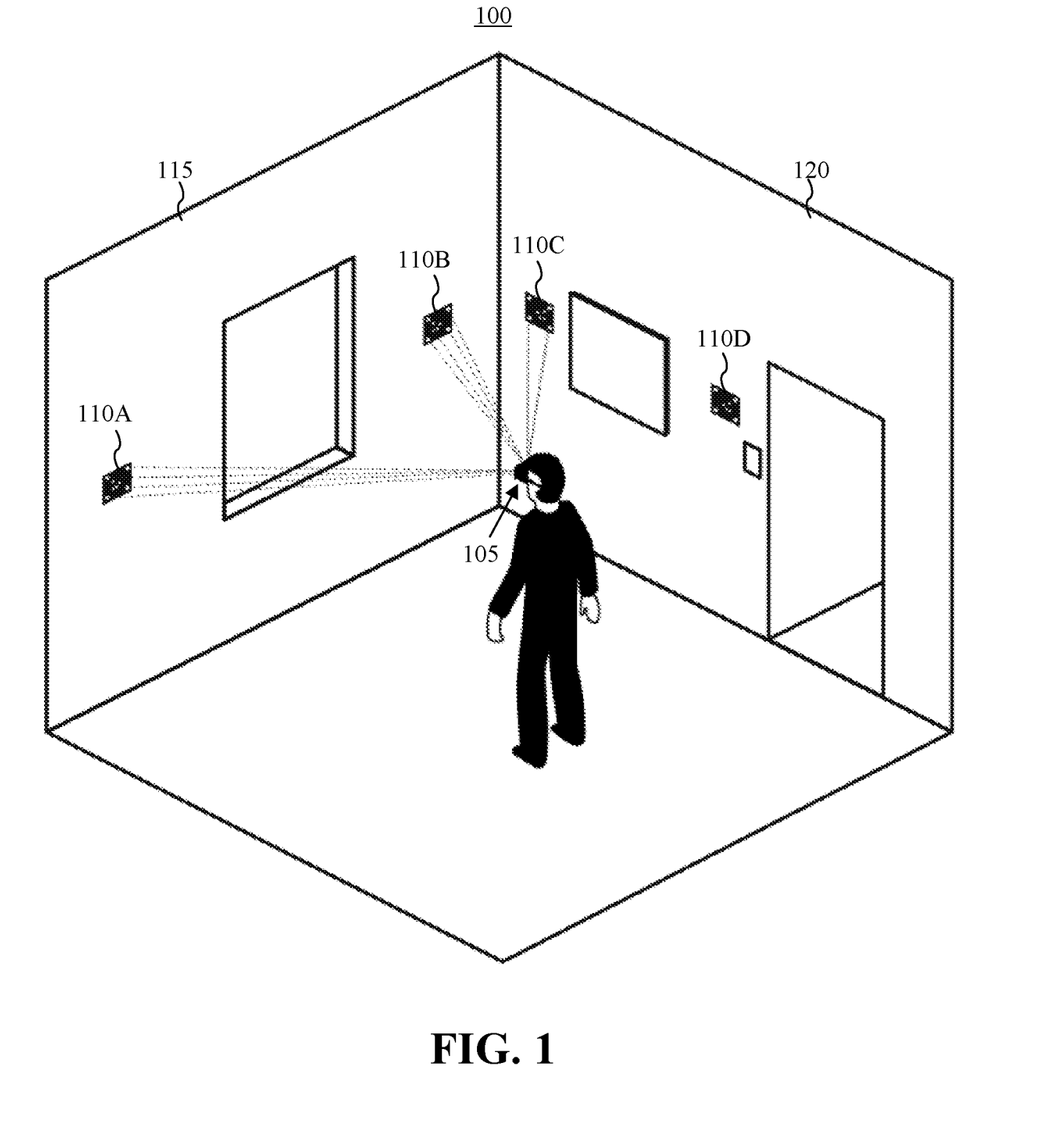
FIG. 1 is a diagram illustrating an example of a system for estimating camera pose and detecting planes within a 3-dimensional (3D) environment.

FIG. 1 is a diagram illustrating an example of a system 100 for estimating camera pose and detecting planes within a 3D environment. In the example of FIG. 1, the 3D environment is a room. For purposes of illustration, the room is shown in cutaway with two walls 115 and 120. System 100 may include a pose determination device (PDD) 105. System 100 may also include one or more markers 110 illustrated in FIG. 1 as markers 110A, 110B, 110C, and 110D.

PDD 105 may include a DVS and processor. Further details relating to PDD 105 are described in greater detail in connection with FIG. 2. As pictured, PDD 105 may be worn by a user, coupled to another device worn by a user, or integrated into a device worn by the user. For example, PDD 105 may be integrated into a virtual reality or an augmented reality headset. It should be appreciated, however, that PDD 105 may be coupled to or include in any of a variety of other devices in which camera pose may be used. For example, PDD 105 may be incorporated into a robot or a vehicle such as an automobile. PDD 105 is capable of estimating camera pose and/or detecting planes within the 3D environment. The estimated camera pose and/or detected planes may be output to another system or device.

Each of markers 110 may include a plurality of light sources, a processor that is capable of controlling operation of each light source, and a power source. In particular embodiments, the light sources may be infrared (IR) light sources. Further details relating to markers 110 are described in greater detail in connection with FIG. 3. In the example of FIG. 1, markers 110 are affixed to walls (e.g., planes) within the 3D environment. Markers 110A and 110B are attached to wall 115. Markers 110C and 110D are attached to wall 120. In one or more embodiments, the light sources in each marker 110 are configured to blink at selected frequencies. For example, for each marker 110, the processor therein may cause a first plurality of light sources to blink at a first frequency and cause a second plurality of light sources to blink at a second frequency. The second frequency is different from the first frequency.

In general, PDD 105 is capable of a detecting one or more of markers 110 based upon detecting the first plurality of light sources of such markers. PDD 105 is capable of determining orientation and identification of markers 110 based upon detection of the second plurality of light sources. For example, PDD 105 is capable of determining whether a given detected marker is marker 110A, 110B, 110C, or 110D based upon the second plurality of markers.

The different applications and configurations of system 100 described within this disclosure are provided for purposes of illustration and not limitation. System 100 may be utilized in any of a variety of different applications where camera pose may be used. Such applications may include, but are not limited to, transportation applications (e.g., autonomous and/or assisted driving), robotics, and computer vision (e.g., augmented reality and/or virtual reality). The embodiments described herein may be particularly suited to applications that operate in low-light conditions due to the high update rate of the DVS within PDD 105 and the ability of the DVS to operate in low-light conditions.

In the case of an augmented reality system or a virtual reality system, system 100 is capable of utilizing the light sources within markers 110 to define the available operating area for the application. Detected patterns corresponding to the first and/or second plurality of light sources of markers 110 allow PDD 105 to determine relative distance from walls or other planes (e.g., surfaces) to which markers 110 are affixed. As such, PDD 105 is also capable of providing feedback, e.g., distance to walls or other planes, to avoid collisions.

In particular embodiments, markers 110 may be designed to be uniquely identified by PDD 105 after an initial setup. As such, system 100 is capable of maintaining the geometric consistency of the playing area in augmented reality and/or virtual reality applications. The identification of a single marker 110 by PDD 105, for example, allows PDD 105 to globally orient itself in the 3D environment. This capability allows system 100 to save or persist the user's virtual environment over multiple, different sessions. System 100 is capable of instantly localizing the 3D environment since a 3D map (corresponding to the locations of markers 110) can be saved from a previous session.

In the example of FIG. 1, two markers are affixed to each wall. In other embodiments, fewer markers or more markers may be affixed to a wall. A minimum of one marker is required for system 100 to operate. It should be appreciated, however, that usage of more markers may add robustness to system 100. Still, the position of markers 110 need not be precise or pre-determined. Since each of markers 110 is configured with a unique signature, PDD 105 is capable of recognizing and distinguishing among each of markers 110.

By using markers 110, system 100 is capable of operating independently of illumination (e.g., various light conditions) of the 3D environment. Further, system 100 is capable of operating independently of the texture and/or structure of the 3D environment. Use of the DVS within PDD 105 provides for a low latency system that is inexpensive and has a high dynamic range capable of operating in both low light and bright 3D environments alike. For example, system 100 may be used in an indoor 3D environment or an outdoor 3D environment. Moreover, use of markers 110 facilitates self-calibration of system 100.

In the example of FIG. 1, markers are placed on stationary planes. In one or more other embodiments, markers 110 may be affixed to a user for purposes of identification. In such systems, for example, PDD 105 (or, for example, multiple PDDs 105) may be placed in various places in the 3D environment such as the corners of a room to detect and identify users or other objects to which markers 110 may be affixed.

Figure 2:
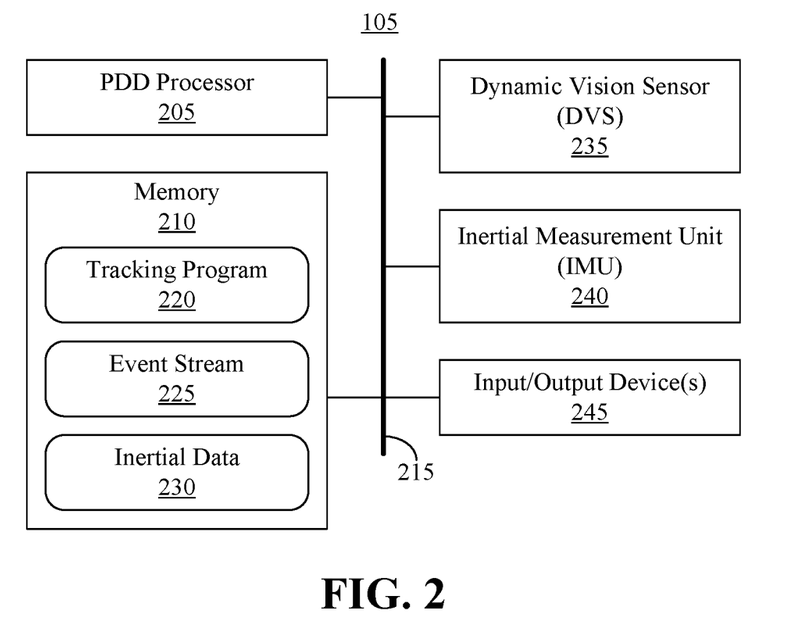
FIG. 2 illustrates an example implementation of a pose determination device (PDD).

FIG. 2 illustrates an example implementation of PDD 105 of FIG. 1. PDD 105 may be implemented, at least in part, using computer hardware. In the example of FIG. 2, PDD 105 includes at least one processor referred to as "PDD processor" 205. PDD processor 205 is coupled to memory 210 through interface circuitry 215. In one or more embodiments, PDD 105 is capable of storing computer readable instructions (also referred to as "program code") and/or data within memory 210. Memory 210 is an example of computer readable storage media. PDD processor 205 is capable of executing the program code accessed from memory 210 via interface circuitry 215.

Memory 210 may include one or more physical memory devices such as, for example, a local memory and a bulk storage device. Local memory refers to non-persistent memory device(s) generally used during actual execution of program code. Examples of local memory include random access memory (RAM) and/or any of the various types of RAM that are suitable for use by a processor during execution of program code (e.g., dynamic RAM or "DRAM" or static RAM or "SRAM"). A bulk storage device refers to a persistent data storage device. Examples of bulk storage devices include, but are not limited to, a hard disk drive (HDD), a solid-state drive (SSD), flash memory, a read-only memory (ROM), an erasable programmable read-only memory (EPROM), electrically erasable programmable read-only memory (EEPROM), or other suitable memory. PDD 105 may also include one or more cache memories (not shown) that provide temporary storage of at least some program code in order to reduce the number of times program code must be retrieved from a bulk storage device during execution.

Examples of interface circuitry 215 include, but are not limited to, a system bus and an input/output (I/O) bus. Interface circuitry 215 may be implemented using any of a variety of bus architectures. Examples of bus architectures may include, but are not limited to, Enhanced Industry Standard Architecture (EISA) bus, Accelerated Graphics Port (AGP), Video Electronics Standards Association (VESA) local bus, Universal Serial Bus (USB), and Peripheral Component Interconnect Express (PCIe) bus. In one or more other embodiments, interface circuitry 215 may be formed of a plurality of independent wired connections among the elements shown.

PDD 105 may also include one or more sensors. In the example of FIG. 2, PDD 105 includes a DVS 235. DVS 235 may be coupled to interface circuitry 215 directly or through an intervening I/O controller. DVS 235 is capable of detecting changes in light intensity. DVS 235, for example, detects changes in light intensity that are larger than a predetermined or threshold amount. For each detected change in light intensity that exceeds the threshold amount, DVS 235 is capable of generating an event. DVS 235, for example, outputs the location and timestamp for each such event. Events correspond to pixels of DVS 235 based upon the location, where each event effectively describes a change in perceived brightness of a pixel. Further, the event may be positive or negative depending upon the direction of the change in light intensity. DVS 235 is capable of outputting the events as an event stream.

Using a DVS provides several advantages over using a conventional RGB sensor (e.g., a conventional CMOS camera). For example, DVS 235 may consume a fraction of the power of an RGB sensor. DVS 235 is also capable of operating at a higher frame rate than an RGB sensor. For example, the resolution of timestamps of events output from DVS 235 are in the order of 1 μs, whereas a typical RGB sensor has a framerate in the millisecond range. DVS 235 further has a higher dynamic range than a conventional RGB sensor thereby allowing DVS 235 to operate in both bright 3D environments and dark 3D environments. For example, DVS 235 may have a dynamic range of approximately 130 dB compared to a 60 dB dynamic range for a typical RGB sensor.

In one or more embodiments, DVS 235 may be implemented as a single DVS, e.g., a single chip or integrated circuit. In one or more other embodiments, DVS 235 may be implemented as a stereo DVS, e.g., where two such DVSs are included. A stereo DVS configuration is capable of providing increased robustness to the image processing described herein. By using stereo DVS, for example, the system is able to better incorporate depth in connection with the image processing that is performed.

PDD 105 may optionally include an IMU 240. IMU 240 is an electronic device that is capable of measuring linear and angular motion. IMU 240 may include one or more accelerometers and gyroscopes to measure linear and angular motion. In particular embodiments, IMU 240 is capable of measuring magnetic field. In such embodiments, IMU 240 may also include one or more magnetometers. IMU 240 outputs the measurements described as inertial data.

PDD 105 may optionally include one or more other I/O devices 245 coupled to interface circuitry 215. I/O devices 245 may be coupled to PDD 105, e.g., interface circuitry 215, either directly or through intervening I/O controllers. Examples of I/O devices 245 include, but are not limited to, a keyboard, a display device, a pointing device, one or more communication ports, and a network adapter. A network adapter refers to circuitry that enables PDD 105 to become coupled to other systems, computer systems, remote printers, and/or remote storage devices through intervening private or public networks. Modems, cable modems, Ethernet cards, and wireless transceivers are examples of different types of network adapters that may be used with PDD 105.

For purposes of illustration, memory 210 stores a tracking program 220. Memory 210 is capable of storing event stream 225 as generated by DVS 235. Memory 210 may also store inertial data 230 generated by IMU 240, if included. Memory 210 is also capable of storing an operating system (not shown) that may be executed by PDD processor 205 and that facilitates execution of program code and the storage of data.

PDD 105 is capable executing tracking program 220 to operate on event stream 225. In one or more embodiments, PDD processor 205 is capable executing tracking program 220 to perform image stabilization on event stream 225 using inertial data 230. PDD processor 205, in executing tracking program 220, is capable of detecting markers within the 3D environment, determining camera pose of DVS 235, identifying the marker(s) that are detected, and/or determining planes within the 3D environment. In particular embodiments, PDD processor 205 is further capable of determining distance between PDD 105 and one or more different markers 110. It should be appreciated that any data used, generated, and/or operated upon by PDD 105 (e.g., PDD processor 205) are functional data structures that impart functionality when employed as part of the system.

In the example of FIG. 2, PDD processor 205 is described as being capable of executing program code. In one or more other embodiments, PDD processor 205 may not execute program code. For example, PDD processor 205 may be implemented as a controller, a Field Programmable Gate array (FPGA), an Application Specific Integrated Circuit (ASIC), or other circuitry that may be hardwired, programmed, or otherwise dedicated (e.g., custom tailored) to perform the operations described herein that are attributable to PDD processor 205 without executing program code.

PDD 105 may include fewer components than shown or additional components not illustrated in FIG. 2. In addition, the particular operating system, application(s), and/or I/O devices included may vary. Further, one or more of the illustrative components may be incorporated into, or otherwise form a portion of, another component. For example, PDD processor may include at least some memory.

PDD 105 may also include a power source (not shown). The power source is capable of providing electrical power to the various elements of PDD 105. In an embodiment, the power source is implemented as one or more batteries. The batteries may be implemented using any of a variety of different battery technologies whether disposable (e.g., replaceable) or rechargeable. In another embodiment, the power source is configured to obtain electrical power from an external source and provide power (e.g., DC power) to the elements of PDD 105. In the case of a rechargeable battery, the power source may include circuitry that is capable of charging the battery or batteries when coupled to an external power source.

In one or more embodiments, PDD 105 may be implemented as a standalone device. The device may be coupled, attached, and/or communicatively linked to another existing device such as a mobile phone, a gaming system, a wearable device, a virtual reality or an augmented reality headset, or a vehicle to provide any of the different types of information determined by PDD 105 to the device. Such information may be provided to other components (not shown) that may be coupled or communicatively linked to PDD 105.

In one or more other embodiments, PDD 105 may be implemented so that DVS 235, IMU 240, and/or I/O device(s) 245 are coupled or attached to another existing device. For example, the noted sensors and/or I/O devices may be coupled or attached to another existing device such as a mobile phone, a gaming system, a wearable device, a virtual or augmented reality headset, or a vehicle. In that case, PDD processor 205, memory 210, and/or interface circuitry 215 may be implemented within or by the device to which the sensors and/or I/O devices are attached, coupled, or communicatively linked. For example, any operational software described herein may be executed by the device to control PDD 105 or elements thereof as one or more peripherals.

Figure 3:
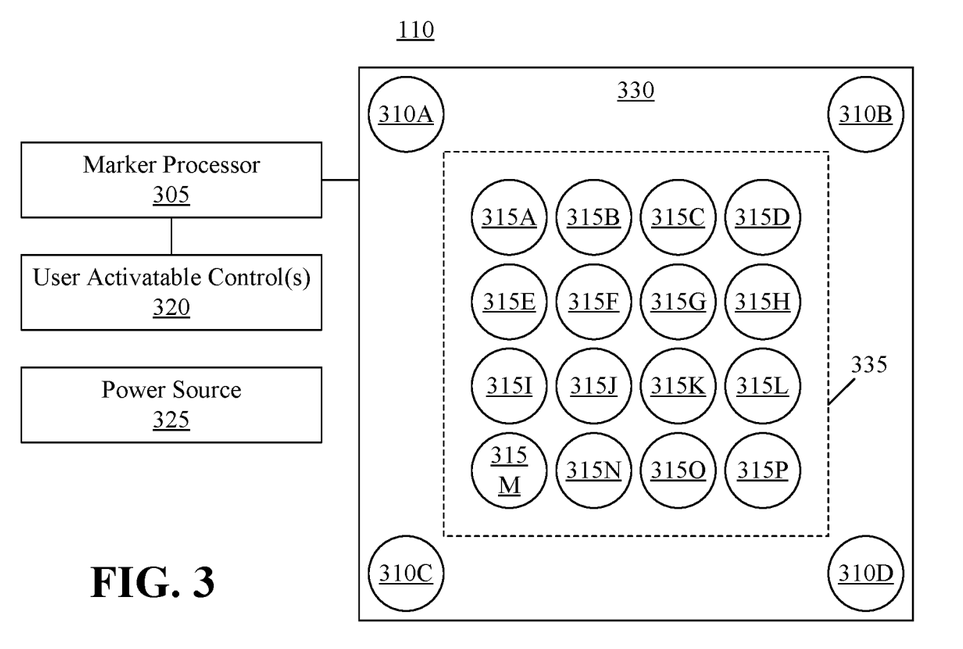
FIG. 3 illustrates an example implementation of a marker.

FIG. 3 illustrates an example implementation of marker 110 of FIG. 1. Marker 110 may be implemented as an active device. In the example of FIG. 3, marker 110 includes a processor referred to as "marker processor" 305, light sources 310, light sources 315, and one or more optional user activatable controls 320. Marker 110 further may include a power source 325. Power source may be implemented as previously described with reference to FIG. 2. From time-to-time within this disclosure, light sources 310 may be referred to as "outer light sources" and light sources 315 may be referred to as "inner light sources."

In one or more embodiments, marker processor 305 is capable of executing program code. For example, processor 305 may be coupled to a memory (not shown) or include memory (e.g., persistent and/or non-persistent memory) that may be used to store the program code. In one or more other embodiments, marker processor 305 does not execute program code. For example, marker processor 305 may be implemented as a controller, an FPGA, an ASIC, or other circuitry that is hardwired, programmed, or otherwise dedicated (e.g., custom tailored) to perform the operations described herein as being attributable to marker processor 305 without executing program code.

In one or more embodiments, light sources 310 and 315 are implemented as IR light sources. As such, the light sources, when active and/or blinking, are not visible to the user. By using light sources, whether IR or non-IR, marker 110 may have any external texture, covering, or appearance that may be aligned with the user's aesthetic preferences.

Light sources 310 and 315 may be implemented as a light emitting diode (LED) or other source of light. Light sources 310 and 315 may be implemented as IR LEDs, IR emitters, or other suitable sources of IR light. In the example of FIG. 3, light sources 310 and 315 are arranged in a housing 330. In one or more embodiments, light sources 310 and 315 may mounted in housing 330 in a common plane so that light sources 310 and 315 form a planar pattern. Appreciably, marker processor 305, user activatable control(s) 320, and power source 325 may be incorporated within housing 330. In the example of FIG. 3, marker processor 305, user activatable control(s) 320, and power source 325 are shown independently of housing 330 for purposes of illustration.

In an illustrative and non-limiting example, light sources 310 and light sources 315 each may be arranged in a square pattern. For example, light sources 310 define a square perimeter. Light sources 315 are located within the perimeter defined by light sources 310. Marker 110 may be approximately 4"×4" in size (e.g., the plane or face including light sources 310 and 315). It should be appreciated, however, that the size of marker 110 and the spacing between light sources included therein may depend upon the size of the wall or surface to which marker 110 is attached and/or the size of the 3D environment in which marker 110 is to be used.

While the front face of marker 110 (e.g., housing 330) is illustrated as being square in shape, marker 110 may be implemented with other shapes. Further, light sources 310 and light sources 315 may be arranged in other shapes. For example, light sources 310 and light sources 315 may be arranged in a rectangular shape or a triangular shape. The particular shape used is not intended as a limitation of the embodiments described.

In any case, light sources 310 define a perimeter that corresponds to a predetermined shape for marker 110. Light sources 315 are arranged in a same or substantially similar shape as that of light sources 310. Light sources 315 may be arranged in a shape that is concentric to the shape of light sources 310. Light sources 315 are fully encompassed within the perimeter formed by light sources 310. For purposes of illustration, perimeter 335, which is defined by light sources 310, is shown with dashed line in FIG. 3 to illustrate how light sources 315 are within perimeter.

Light sources 310, referring to light source 310A, 310B, 310C, and 310D, taken collectively, may be referred to as the first plurality of light sources. Light sources 315, referring to selected ones of light sources 315A, 315B, 315C, 315D, 315E, 315F, 315G, 315H, 315I, 315J, 315K, 315L, 315M, 315N, 315O, and 315P, taken collectively, may be referred to as the second plurality of light sources. Marker processor 305 is capable of controlling operation of light sources 310 and 315. More particularly, marker processor 305 is capable of controlling the frequency at which light sources 310 and 315 blink or are modulated.

For example, marker processor 305 may cause light sources 310 to blink at a first frequency and one or more of light sources 315 (e.g., selected light sources 315) to blink at a second frequency. The second frequency may be different from the first frequency. In particular embodiments, the first frequency is higher than, or exceeds, the second frequency. As an illustrative and non-limiting example, marker processor 305 may cause light sources 310 to blink at a frequency of 100 Hz or approximately 100 Hz. Marker processor 305 may cause one or more of light sources 315 to blink at a frequency of 20 Hz or approximately 20 Hz. In other examples, light sources 310 and 315 may blink at different frequencies in the kilohertz range, where the first frequency exceeds the second frequency.

DVS 235 operates sufficiently fast so as to allow PDD processor 205 to distinguish among light sources based upon the differing blinking frequencies. PDD processor 205, for example, may distinguish between light sources 310 and light sources 315 based upon detected blinking frequencies. PDD processor 205 is further capable of determining patterns that may be formed by light sources 310 and/or light sources 315.

Marker processor 305 is capable of deactivating one or more of light sources 315 so that such light sources do not blink (e.g., remain off). Marker processor 305, for example, is capable of generating a random pattern and implementing that pattern using light sources 315. Marker processor 305 is capable of implementing the pattern by deactivating one or more of light sources 315, while causing the other ones of light sources 315 that remain active to blink at the second frequency. While the pattern formed by light sources 315 may be randomly generated, the pattern may conform with particular rules. For example, the pattern may not be symmetric about either the x-axis or the y-axis defining the plane in which the light sources of marker 110 are located and having an origin at a center of light sources 315. By enforcing this rule, presuming PDD 105 is programmed with the particular pattern generated by marker 110, PDD 105 is capable of determining the orientation of marker 110 and also determining the identity of marker 110 (e.g., whether marker 110 is marker 110A, 110B, 110C, or 110D of FIG. 1).

User activatable control(s) 320 may be included to initiate operations such as power on of marker 110, power off of marker 110, and/or the generation of the random pattern implemented by light sources 315. Marker 110 may include one control for each of the operations listed or fewer controls where a control may be multi-functional and capable of initiating more than one of the operations described. In particular embodiments, turning on marker 110 may cause marker processor 305 to automatically generate and implement a random pattern, e.g., a last generated random pattern, without the user having to provide a further input.

Figure 4A:
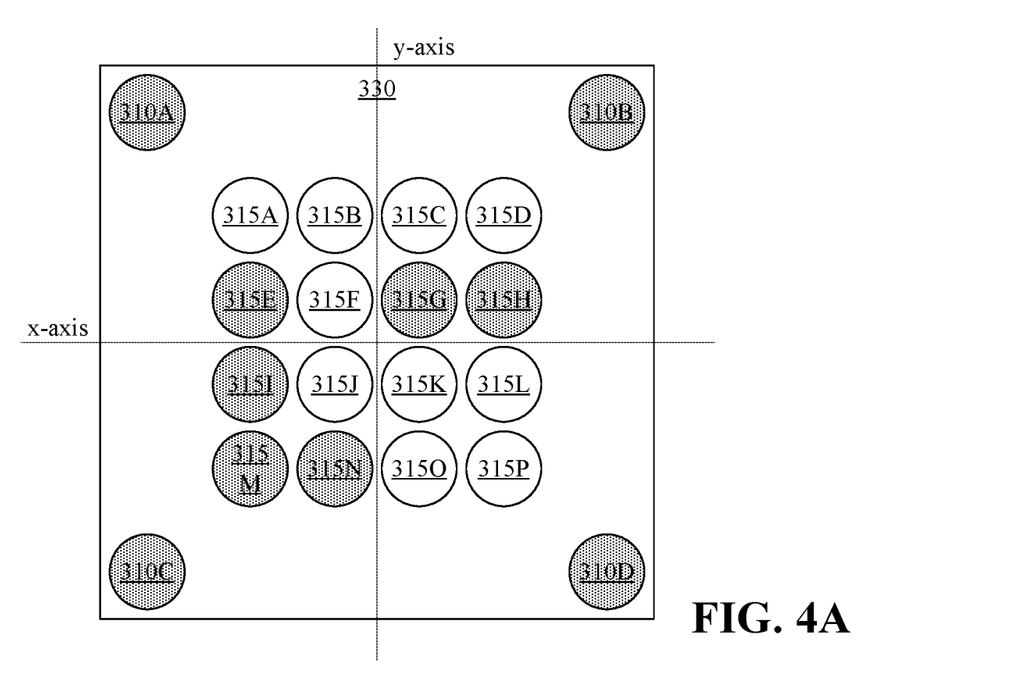
FIGS. 4A and 4B illustrate example patterns that may be generated by the marker of FIG. 3.
Figure 4B:
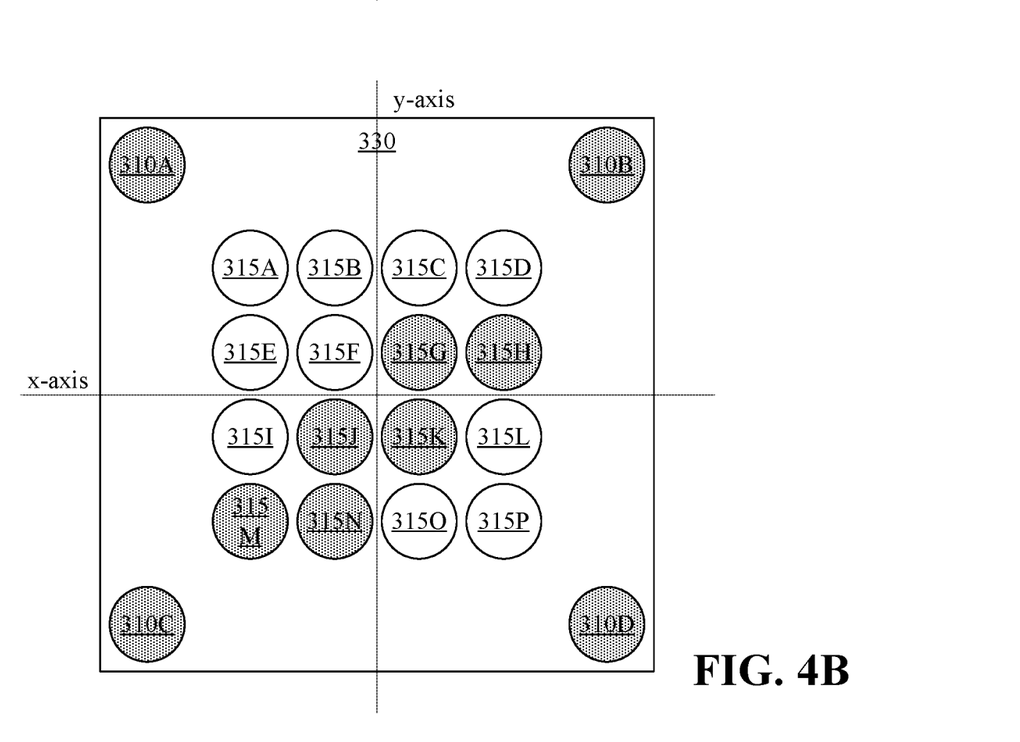

FIGS. 4A and 4B illustrate example patterns that may be generated by a marker. In the examples of FIGS. 4A and 4B, light sources that are active and blinking are shaded. Those light sources that are deactivated (e.g., not blinking and turned off) are not shaded. In each of FIGS. 4A and 4B, light sources 310 (310A, 310B, 310C, and 310D) are all active and blinking. In general, PDD 105 uses light sources 310 to detect a marker. Light sources 310, for example, blink at the first frequency, which is known by PDD 105, and are arranged in a known shape that is associated with, or indicative of, the markers.

In each of FIGS. 4A and 4B, one or more of light sources 315 are turned off resulting in a pattern of selected light sources 315 (e.g., the second plurality of light sources) that is asymmetric about the x-axis and the y-axis. For example, referring to FIG. 4A, light sources 315A, 315B, 315C, 315D, 315F, 315J, 315K, 315L, 315O, and 315P are turned off. As such, only light sources 315E, 315G, 315H, 315I, 315M, and 315N form the pattern and blink at the second frequency. For purposes of illustration, the pattern illustrated in FIG. 4A may be associated with marker 110A of FIG. 1.

Referring to FIG. 4B, light sources 315A, 315B, 315C, 315D, 315E, 315F, 315I, 315L, 315O, and 315P are turned off. As such, only light sources 315G, 315H, 315J, 315K, 315M, and 315N form the pattern and blink at the second frequency. For purposes of illustration, the pattern illustrated in FIG. 4B may be associated with marker 110B of FIG. 1, thereby allowing PDD 105 to differentiate between marker 110A and marker 110B. Each of the markers 110 used in the 3D environment displays a unique pattern using light sources 315. Accordingly, other unique patterns may be used for markers 110C and 110D.

In the examples of FIGS. 3 and 4, markers are shown with four of the first plurality of light sources corresponding to light sources 310 and 16 light sources 315. The number of light sources used, however, may vary. In one or more other embodiments, more than four light sources may be used for light sources 310. In one or more other embodiments, fewer than 16 or more than 16 light sources may be used as light sources 315. Further, as noted, the light sources may be arranged in different shapes. For example, a marker may be implemented with a circular shape using five outer light sources marking corners of the circular shape and using five inner light sources in the center, e.g., within the perimeter defined by the outer light sources. Appreciably, the number of light sources, at least of light sources 315, may vary based upon the number of markers 110 that may be used with system 100.

Figure 5:
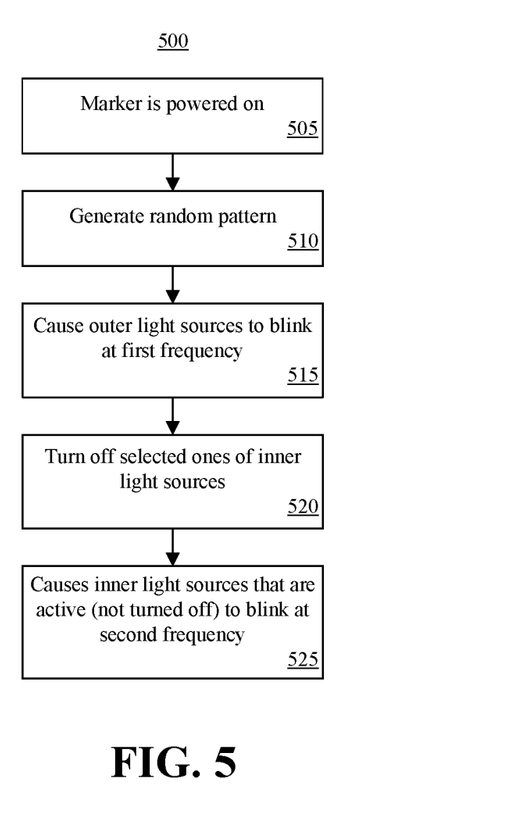
FIG. 5 illustrates an example method of operation of a marker.

FIG. 5 illustrates an example method 500 of operation of a marker. Method 500 may be performed by each marker 110 included in the system described in connection with FIG. 1.

In block 505, the marker is powered on. For example, a user may access a user activatable control to power on the marker. In block 510, the marker processor is capable of generating a random pattern. As discussed, the random pattern is asymmetric about the x-axis and the y-axis. In one or more embodiments, the marker processor is capable of checking the randomly generated pattern to ensure that the pattern is asymmetric about the x-axis and y-axis. In response to determining that the pattern is symmetric about one or both axes, the marker processor may generate a further random pattern and continue to do so until the pattern that is generated complies with the asymmetry rules described herein.

In block 515, the marker processor causes the outer light sources, e.g., light sources 310, to blink at the first frequency. As noted, each one of the outer light sources blinks at the first frequency. In block 520, the marker processor turns off selected ones of the inner light sources, e.g., light sources 315, so that the selected light sources do not blink. In block 525, the marker processor of causes the remaining ones of the inner light sources that are active, e.g., light sources 315 that are not turned off, to blink at the second frequency thereby generating the pattern determined in block 510.

In one or more other embodiments, the marker processor may store the most recent pattern that is generated and implemented in local memory therein. The marker may be capable of powering on and recalling the prior or last used pattern from memory and generating such pattern using the inner light sources. In that case, the marker may be configured to generate a new and/or different pattern only in response to a further user input.

Figure 6:
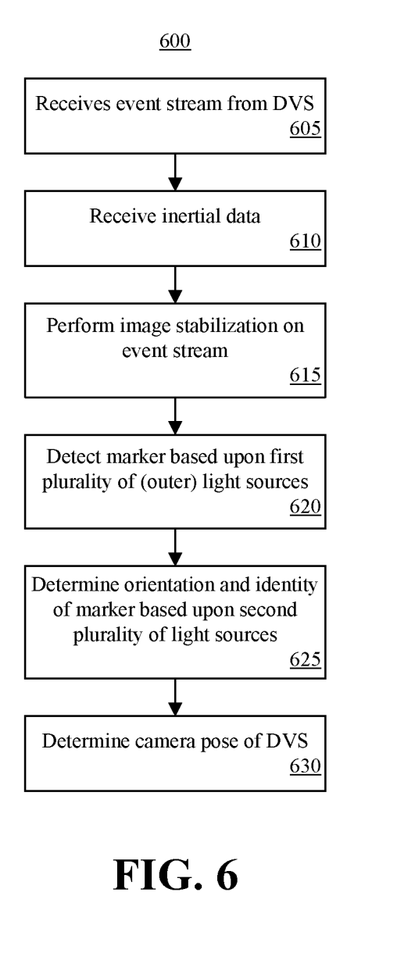
FIG. 6 illustrates an example method of estimating camera pose and detecting planes.

FIG. 6 illustrates an example of method 600 estimating camera pose and detecting planes. Method 600 may be performed using the system described in connection with FIG. 1. Method 600 may begin in a state where one or more markers are turned on and are displaying patterns as described with reference to FIGS. 4 and 5. Each marker displays a unique pattern. Further, the light sources of the markers may be IR light sources.

In one or more embodiments, the PDD may be configured, or programmed, with the pattern displayed by each of the markers used with the system. For example, the PDD processor may execute an application that allows the user to capture the pattern of each marker once activated and associate that pattern with a particular marker, e.g., with the identity of a particular marker. The associations between patterns and marker identities may be stored within the PDD in memory. This process need only be performed in cases where one or more patterns displayed by marker(s) have changed since the last session in which system 100 was used. Accordingly, the PDD may begin operating with the DVS contained therein generating an event stream. The system is self-calibrating as to determining locations of the markers relative to the PDD.

While method 600 is described in terms of detecting a single marker, it should be appreciated that the PDD may detect multiple different markers within a 3D environment using the techniques described in connection with FIG. 6. Further, method 600 may be performed in an iterative manner in order to continually locate and/or track markers within the 3D environment.

In block 605, the PDD processor receives the event stream from the DVS. For example, the DVS may generate the event stream. The DVS may store the event stream within the memory of the PDD. The PDD processor is capable of reading the event stream from the memory.

In block 610, the PDD processor optionally receives inertial data generated by the IMU (e.g., if included within the PDD). The IMU is capable of generating inertial data concurrently with the event stream. The inertial data generated by the IMU, for example, may be synchronized in time with the event stream. The IMU is capable of storing the inertial data within the memory of the PDD. The PDD processor may read the inertial data from the memory.

In bock 615, the PDD processor optionally performs image stabilization on the event stream. The PDD processor is capable of using the inertial data to detect movement of the DVS and adjust the event stream to accommodate for such motion thereby stabilizing the event stream. The PDD processor may use any of a variety of available image stabilization techniques to operate on the event stream. As an illustrative and non-limiting example, the PDD processor may implement a technique as described in Delbruck, et al., "*Integration of Dynamic Vision Sensor with Inertial Measurement Unit for Electronically Stabilized Event-Based Vision,*" 2014 IEEE International Symposium on Circuits and Systems (ISCAS), Melbourne VIC, Australia, 1-5, June 2014.

In block 620, the PDD processor is capable of detecting a marker within the 3D environment. The PDD processor is capable of detecting a marker based upon detecting the first plurality of light sources, e.g., the outer light sources corresponding to light sources 310. For example, the PDD processor is capable of processing the event stream to detect the outer light sources of a marker based, at least in part, upon the known blinking rate of the outer light sources, the known number of outer light sources in a marker, and the known shape (e.g., size and geometry) of the outer light sources in a marker. The PDD detects a marker when the number of known outer light sources are detected that blink at the first frequency and that are arranged in the known shape.

The PDD processor is capable of differentiating outer light sources from inner light sources based upon detected blinking frequency. The PDD processor, for example, is capable of detecting the blinking frequency of a light source based upon events corresponding to on and off transitions of pixel locations corresponding to the outer light sources. In one or more embodiments, the outer light sources are detected using an accumulated buffer of events over a specified time interval. The time interval between the outer light sources blinking (e.g., the blinking time interval or period) must be lower than that of the event buffer for the PDD processor to always detect the outer light sources.

The PDD processor is also capable of detecting the outer light sources based, at least in part, on whether the detected light sources blinking at the first frequency are arranged in the known shape of the outer light sources for a marker. The PDD processor is capable of determining the position of the marker in the 3D environment based upon the known shape of the outer light sources, which may be square, using available or known projection techniques.

In one or more embodiments, the PDD processor filters the event stream to detect the number of light sources known to be outer light sources of the marker. The PDD processor is capable of processing the event stream to identify local maxima corresponding to the outer light sources of a marker. In particular embodiments, the PDD processor is capable of applying a cluster-based tracking technique that follows new or incoming pixels (e.g., events) agglomerated with prior received pixels.

In block 625, the PDD processor is capable of determining an orientation and an identity of the marker detected in block 630. The PDD processor may determine orientation and identity of the marker based upon detecting the second plurality of light sources. The PDD processor is capable of detecting the second plurality of light sources, e.g., the blinking ones of the inner light sources corresponding to light sources 315. For example, the PDD processor is capable of processing the event stream to detect the inner light sources of a marker based, at least in part, upon the known blinking rate of the inner light sources, known patterns generated by the inner light sources for the different markers, and/or the location of the detected inner light sources being within a perimeter defined by the outer lights sources for the marker. The PDD, is capable of determining the pattern generated by the second plurality of light sources and matching the determined pattern to a pattern associated with a particular one of the markers stored in memory. Based upon recognizing the known pattern, the PDD processor is further capable of determining the identity of the marker detected in block 620 and the orientation of the marker based upon the orientation of the determined pattern formed by the second plurality of light sources.

As an illustrative example, consider the case where the outer light sources are arranged in a square. The PDD processor may utilize the same or similar techniques described in connection with block 620 to identify the second plurality of light sources, e.g., the pattern formed by the inner light sources of the marker that are blinking and not turned off. Once the corners of a marker are detected, the PDD processor knows the position of the marker in the 3D environment. The PDD processor is capable of determining the orientation and identity of the marker based upon the pattern generated by the blinking inner light sources of the marker.

In one or more embodiments, the PDD processor creates a new thread of execution. The PDD processor is capable of creating a rectangular buffer containing the events generated by the DVS that correspond to locations inside the marker detected in block 620, e.g., inside the perimeter defined by the external light sources of the marker. The buffer may include events occurring within a fixed time interval, e.g., 50 milliseconds. The PDD processor is capable of filtering the events of the buffer to identify the internal light sources forming the pattern. Since the position of the marker may be determined from the positions of the external light sources, the PDD processor is capable of using a projection matrix to determine the orientation of the marker based upon the detected pattern formed by the second plurality of light sources and determine the identity of the marker.

In block 630, the PDD processor is capable of determining the camera pose of the DVS. For example, the PDD processor may map the position of each detected marker together with the relative position of the DVS using triangulation. In cases where multiple markers are detected, the PDD processor is capable of saving the relative position of each such marker in memory. In this regard, the PDD is self-calibrating. Having determined the relative position of markers in the 3D environment (e.g., in block 620) the PDD is capable of outputting such locations as detected planes to other systems used with the PDD.

While particular parameters such as the size of markers, the spacing and number of light sources, the blinking frequency of light sources, and the buffer time-window (e.g., interval of events in the buffer) may be known, such parameters may be varied in order to adapt the system to different 3D environments. For example, such parameters may be varied to adapt to different sizes of rooms or outdoor environments and/or the number of markers on the wall or other plane.

In one or more alternative embodiments, a marker-less, visual-inertial odometry system may be used to perform initial setup and parameter tuning for the embodiments described within this disclosure. Marker-less, visual-inertial odometry may utilize images for determining camera pose with the aid of inertial data from an IMU, for example.

In one or more other embodiments, a device used with the embodiments described herein or an application executing on the PDD, for example, may be used to determine more optimal positions for markers within a given 3D environment to maximize coverage of the system. As an example, in the case of a virtual reality gaming system, the embodiments describe within this disclosure may be used to track the markers in real-time and to keep track of the distance and coverage of the playing area. The PDD may be configured to provide a signal or warning, for example, in response to determining that the PDD (and as such the user) is within a predetermined distance of a plane (e.g., a marker), thereby avoiding a user collision with the plane.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

The term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The different types of memory, as described herein, are examples of a computer readable storage media. A non-exhaustive list of more specific examples of a computer readable storage medium may include: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, or the like.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, the terms "one embodiment," "an embodiment," "one or more embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," and similar language throughout this disclosure may, but do not necessarily, all refer to the same embodiment. The terms "embodiment" and "arrangement" are used interchangeably within this disclosure.

As defined herein, the term "output" means storing in physical memory elements, e.g., devices, writing to a display or other peripheral output device, sending or transmitting to another system, exporting, or the like.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real-time" means a level of processing responsiveness that a user or system senses as sufficiently immediate for a particular process or determination to be made, or that enables the processor to keep up with some external process.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present invention. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may specify state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In this way, operatively coupling the processor to program code instructions transforms the machine of the processor into a special-purpose machine for carrying out the instructions of the program code. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowcharts or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

The description of the embodiments provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
    detecting a marker within a 3-dimensional (3D) environment by detecting, using a Dynamic Vision Sensor (DVS), a first plurality of light sources arranged in a known shape and blinking at a first frequency, wherein the known shape corresponds to the marker;
    determining an orientation and an identity of the marker based upon detecting, using the DVS, a second plurality of light sources corresponding to the marker and blinking at a second frequency different from the first frequency; and
    determining, using a processor, a camera pose for the DVS based upon the known shape, the orientation, and the identity of the marker.

2. The method of claim 1, further comprising:
    determining a plane within the 3D environment corresponding to a location of the marker within the 3D environment.

3. The method of claim 1, further comprising:
    performing image stabilization on an event stream generated by the DVS based upon inertial data generated by an Inertial Measurement Unit.

4. The method of claim 1, wherein the determining the orientation and the identity of the marker includes determining that the second plurality of light sources are within a perimeter defined by the first plurality of light sources.

5. The method of claim 1, wherein the first frequency exceeds the second frequency.

6. The method of claim 1, wherein the first plurality of light sources includes at least four light sources.

7. The method of claim 6, wherein the first plurality of light sources defines a square shape.

8. The method of claim 1, wherein the second plurality of light sources form a planar shape that is asymmetric about an x-axis and a y-axis.

9. The method of claim 1, wherein the first plurality of light sources and the second plurality of light sources are infrared light sources.

10. A system, comprising:
    a Dynamic Vision Sensor (DVS) configured to generate an event stream;
    a memory configured to store the event stream;
    a processor coupled to the memory and configured to perform operations using the event stream including:
    detecting a marker within a 3-dimensional (3D) environment by detecting a first plurality of light sources of the marker configured to blink at a first frequency, wherein the marker has a known shape;
    determining an orientation and an identity of the marker based upon detecting a second plurality of light sources of the marker configured to blink at a second frequency different from the first frequency; and
    determining a camera pose for the DVS based upon the known shape, the orientation, and the identity of the marker.

11. The system of claim 10, wherein the processor is configured to perform operations further comprising:
    determining a plane within the 3D environment corresponding to a location of the marker within the 3D environment.

12. The system of claim 11, further comprising an Inertial Measurement Unit (IMU) coupled to the processor and configured to generate inertial data, wherein the processor is configured to perform operations further comprising:
    performing image stabilization on the event stream generated by the DVS based upon the inertial data.

13. The system of claim 11, wherein the determining the orientation and the identity of the marker includes determining that the second plurality of light sources are within a perimeter defined by the first plurality of light sources.

14. The system of claim 11, further comprising:
    the marker, wherein the marker includes the first plurality of light sources and the second plurality of light sources.

15. The system of claim 14, wherein the first plurality of light sources includes at least four light sources.

16. The system of claim 14, wherein the first frequency exceeds the second frequency.

17. The system of claim 14, wherein the first plurality of light sources defines a square shape.

18. The system of claim 14, wherein the second plurality of light sources form a planar shape that is asymmetric about an x-axis and a y-axis.

19. The system of claim 11, wherein the first plurality of light sources and the second plurality of light sources are infrared light sources.

20. A computer program product, comprising:
    a computer readable storage medium having program code stored thereon, the program code executable by computer hardware to initiate operations including:
    detecting a marker within a 3-dimensional (3D) environment by detecting, using a Dynamic Vision Sensor (DVS), a first plurality of light sources arranged in a known shape and blinking at a first frequency, wherein the known shape corresponds to the marker;
    determining an orientation and an identity of the marker based upon detecting, using the DVS, a second plurality of light sources corresponding to the marker and blinking at a second frequency different from the first frequency; and
    determining a camera pose for the DVS based upon the known shape, the orientation, and the identity of the marker.

21. The computer program product of claim 20, wherein the program code is executable by the computer hardware to initiate operations further comprising:

determining a plane within the 3D environment corresponding to a location of the marker within the 3D environment.

22. The computer program product of claim 20, wherein the program code is executable by the computer hardware to initiate operations further comprising:

performing image stabilization on an event stream generated by the DVS based upon inertial data generated by an Inertial Measurement Unit.

23. The computer program product of claim 20, wherein the determining the orientation and the identity of the marker includes determining that the second plurality of light sources are within a perimeter defined by the first plurality of light sources.

24. The computer program product of claim 20, wherein the first frequency exceeds the second frequency.

25. The computer program product of claim 20, wherein the first plurality of light sources includes at least four light sources.

26. The computer program product of claim 25, wherein the first plurality of light sources defines a square shape.

27. The computer program product of claim 20, wherein the second plurality of light sources form a planar shape that is asymmetric about an x-axis and a y-axis.

28. The computer program product of claim 20, wherein the first plurality of light sources and the second plurality of light sources are infrared light sources.

\* \* \* \* \*